United States Patent [19]

Veigl

[11] Patent Number: 4,757,413
[45] Date of Patent: Jul. 12, 1988

[54] RECORDING AND REPRODUCING APPARATUS

[75] Inventor: Johann Veigl, Vienna, Austria

[73] Assignee: U.S. Philips Corporation, New York, N.Y.

[21] Appl. No.: 63,366

[22] Filed: Jun. 17, 1987

[30] Foreign Application Priority Data

Jun. 17, 1986 [AT] Austria .................................. 1649/86

[51] Int. Cl.⁴ .......................................... G11B 15/10
[52] U.S. Cl. .................................................... 360/137
[58] Field of Search ........................................ 360/137

[56] References Cited

U.S. PATENT DOCUMENTS 4,704,651 11/1987 Nagaya et al. ...................... 360/137

Primary Examiner—Robert S. Tupper
Attorney, Agent, or Firm—David R. Treacy

[57] ABSTRACT

Figure 2:
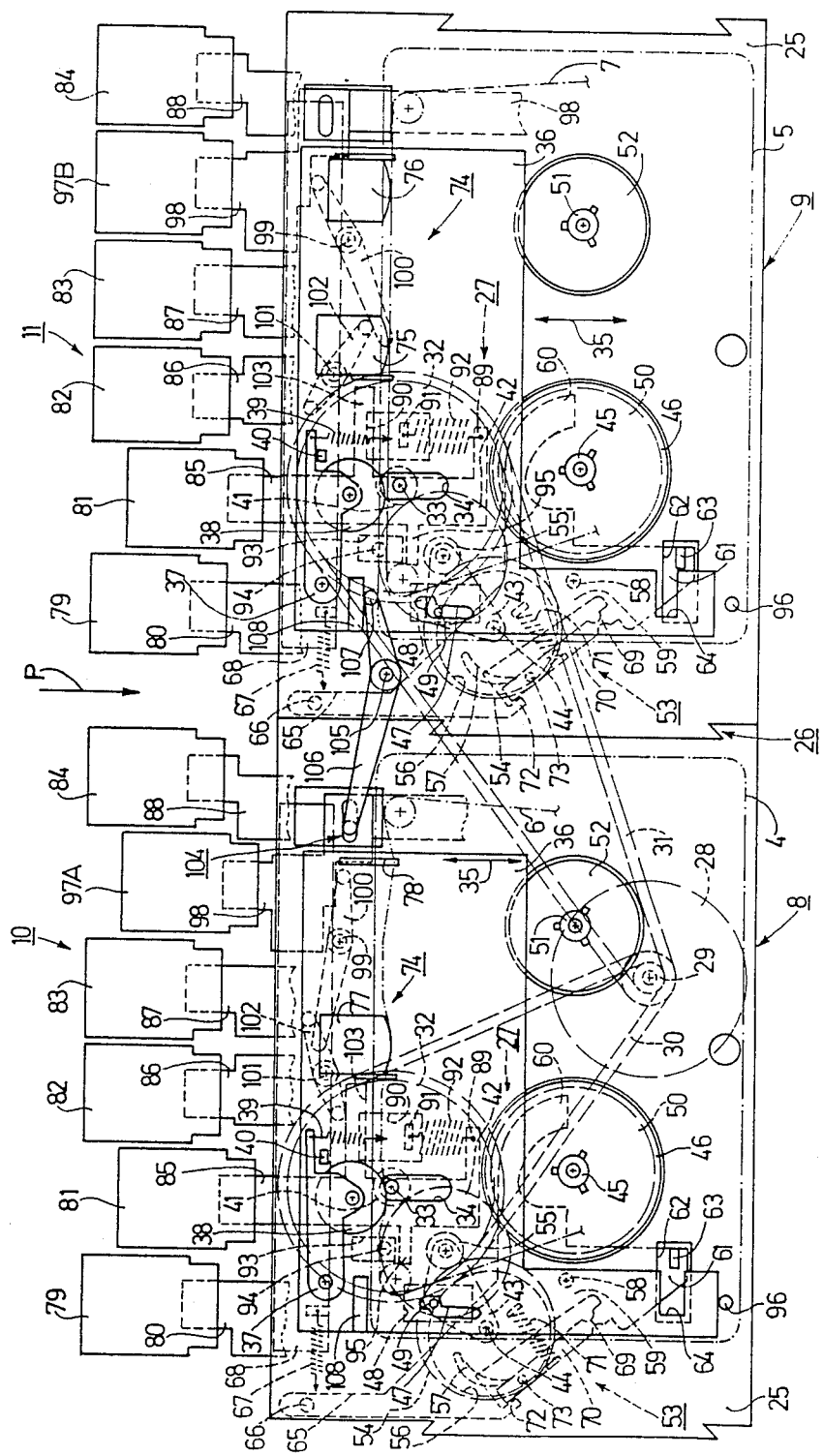

In a recording and reproducing apparatus (1) for record carriers (6, 7) in the form of a tape contained in cassettes (4, 5), comprising a reproduction deck (8) and a recording/reproduction deck (9), which each comprise a drive means (27), a scanning device (74), a positioning device (36) for positioning the scanning device (74), at least one drive element (38, 42) of the drive means (27), and a keyset (10, 11) for selecting the modes of operation of the two decks (8, 9), the two keysets comprise equal numbers of keys (79, 81, 82, 83, 84, 97A, 97B) and the "successive normal reproduction" mode can be obtained by actuating the key (97A) of the keyset (10) of the reproduction deck (8), which key corresponds to the key (97B) for the "normal reproduction" mode of the keyset (11) of the recording/reproduction deck (9), and the key (81) for the "normal reproduction" mode of the keyset (11) of the recording/reproduction deck (9), the first-mentioned key (97A) enabling the reproduction deck (8) to be set to "normal reproduction" mode and the recording/reproduction deck (9) to be set to the "standby" mode (FIG. 2).

1 Claim, 2 Drawing Sheets

RECORDING AND REPRODUCING APPARATUS

The invention relates to a recording and reproducing apparatus for record carriers in the form of tapes accommodated in cassettes, comprising a first deck for driving and scanning a first record carrier which deck is constructed for reproduction only and can be set to act least the "stop", "stand-by" and "normal reproduction" modes, and comprising a second deck for driving and scanning a second record carrier, which deck is constructed for recording and reproducing and can be set to at least the "stop", "stand-by", "normal reproduction" and "normal recording" modes, which decks each comprise a drive means for driving the relevant record carrier, which drive means each comprise a plurality of drive elements, a scanning device for scanning the relevant record carrier and a positioning device which can be set to a stop position, a stand-by position and a normal-transport position, for positioning the scanning device and at least one drive element of the drive means of the relevant deck in comformity with the mode to which said deck is set, and which each comprise a key set comprising a plurality of keys for selecting the modes of operation of the relevant decks, the positioning device of each deck being movable by actuation of at least one key of the keyset of each deck and both decks being switchable to a "successive normal reproduction" mode by actuation of a key of the keyset of the first deck and at least the key for the "normal reproduction" mode of the keyset of the second deck, in which "successive normal reproduction" mode first the positioning device in the first deck is set to its normal-transport position to obtain the "normal reproduction" mode and the positioning device in the second deck is set to its stand-by position to obtain the "standby" mode, subsequently the positioning device in the first deck is set to its stop position to obtain the "stop" mode and the positioning device in the second deck is set to its normal-transport position to obtain the "normal reproduction" mode, and after this the positioning device in the second deck is also set to its stop position to obtain the "stop" mode, and comprising a control lever which extends from the first deck to the second deck, which lever in the "successive normal reproduction" mode, when the first deck is in the "stop" mode, controls the start of the "normal reproduction" mode in the second deck.

When in the "successive normal reproduction" mode of an apparatus of the type defined in the opening paragraph the first deck is in the reproduction mode the second deck is set to "stand-by", the actuating device being in its stand-by position and this accurating device ensuring that a drive wheel for the winding spindle and the pressure roller of the drive means of the second deck remain disengaged, so that the second record carrier is not driven. Since the pressure roller and the drive wheel for the winding spindle are disengaged and the pressure roller is lifted off the capstan, the second record carrier is not driven even when the motor for driving the drive means is switched on, as is the case if the apparatus comprises only one motor which is common to the drive means of both tape decks and which, when switched on, drives the drive means of both tape decks simultaenously. Further, in the "successive normal reproduction" mode of an apparatus of the type defined in the opening paragraph timing for the purpose of carrying out the "normal reproduction" modes in the two decks is effected purely mechanically by means of the control lever.

In a known apparatus of the type defined in the opening paragraph the keysets of the two decks have different numbers of keys, the keyset of the first deck, which is constructed for reproduction only, as compared with the keyset of the second deck, which is constructed for recording and reproduction, does not comprise a key for starting the "normal recording" mode. Thus, the two decks differ in respect of their keysets. This is not favourable in view of a unitary construction of the two decks, which is a requirement for an economical manufacture of the decks. To start the "successive normal reproduction" mode in this known apparatus the key for the "normal reproduction" mode of the keyset of the first deck, the key for the "stand-by" mode of the keyset of the second deck, and the key for the "normal reproduction" mode of the keyset of the second deck must be actuated consecutively, so that in total three keys must be actuated in the correct sequence, which is unfavourable in order to simplify operation. After their actuation, which is effected against the force of return springs, the keys are locked in their on-positions. Moreover, the control lever in this known apparatus is movable from a rest position into an operating position by means of the key for the "normal reproduction" mode of the keyset of the first deck when this key is actuated, which lever is returned from this operating position to its rest position when the key for the "normal reproduction" mode of the keyset of the first deck is switched from its on-position to its off-position when the first deck is set to "stop". The first deck can be switched to "stop" by actuating the key for this mode of the keyset of the first deck or by an end-stop device of the first deck, which device sets the apparatus to "stop" when the end of the first record carrier in the first deck is reached. When the control lever is returned to its rest position as stated above, the key for the "stand-by" mode of the keyset of the second deck is released via an additional intermediate lever, so that this key returns from its on-position to its off-position and subsequently the actuating device of this second deck is set to its normal-transport position and the "normal reproduction" mode is started. In this construction the control lever controls starting of the "normal reproduction" mode in the second deck via the intermediate lever and via the key for "stand-by" of the keyset of the second deck, which is comparatively intricate and unfavourable for a high reliability.

It is the object of the invention to mitigate the above problems and to construct an apparatus of the type defined in the opening paragraph in such a way that the two decks and the entire apparatus can be manufactured economically, that the "successive normal reproduction" mode can be selected by actuating less than three keys of the keysets of the two decks, and that a simple and reliable control function of the control lever is obtained. To this end the invention is characterized in that the keysets of the two decks comprise equal numbers of keys, in that the "successive normal reproduction" mode can be started by actuating the key of the keyset of the first deck, which corresponds to the key for the "normal recording" mode of the keyset of the second deck, and the key for the "normal reproduction" mode of the keyset of the second deck, and in that by actuating the key of the keyset of the first deck, which corresponds to the key for the "normal recording" mode of the keyset of the second deck, the positioning device in the first deck is set to the normal-transport position to obtain the "normal reproduction" mode and via the control lever which is movable by actuation of said key in the second deck the positioning device of this deck is set to its stand-by position to obtain "stand-by" mode. In this way it is achieved that both decks of the apparatus comprise identical keysets, which is favourable in view of a most unitary construction of both decks and, consequently, an economical production of the decks and hence the entire apparatus and that for selecting the "successive normal reproduction" mode only two keys, namely one key of each of the keysets of the two decks, have to be actuated, which simplifies operation, the key of the keyset of the first deck which corresponds to the key for "normal recording" of the keyset of the second deck performing a double function because this key enables the first deck to be set to "normal reproduction" and, via the control lever, the second deck to be set to "stand-by". Since the control lever cooperates directly with the actuating device of the second deck a very simple and reliable control function of the control lever is obtained.

In this respect it is to be noted that an apparatus comprising two decks, one for reproduction and one for recording and reproduction, is known but is of a type other than that defined in the opening paragraph. When in the "successive normal reproduction" mode of this known apparatus the first deck is set to reproduction the second deck, in contradistinction to that in an apparatus of the type defined in the opening paragraph, is not set to the "stand-by" but the power-supply to the motor for the drive means of the second deck is switched off by means of electrical switches, so that the second record carrier is not driven. Since the power supply to the motor for the drive means of the second deck is switched off all the time that the first deck is set to reproduction and consequently this motor does not run, it can be used only for driving the drive means of the second deck and not at the same time for driving the drive means of the first deck. Therefore, this known apparatus requires a separate motor to drive the relevant drive means of each deck, which is not necessary in an apparatus of the type defined in the opening paragraph, because in this apparatus the desired result can be achieved simply by means of one motor, which is common to both decks as already stated above. Moreover, in the "successive normal reproduction" mode of this known apparatus timing control for successively carrying out the "normal reproduction" mode in the two decks is not effected simply by mechanical means as in an apparatus of the type defined in the opening paragraph, but electrically by means of the said electrical switches which during reproduction by the first deck connect the motor for the drive means of the first deck to and disconnect the motor for the drive means of the second deck from the power supply and when the first deck is set to "stop", which is effected by actuating the appropriate key of the keyset of the first deck or by actuation of an end-stop device of the first deck, disconnect the motor for the drive means of the first deck from and connect the motor for the drive means of the second deck to the power supply. Such an electrical control is more expensive than mechanical control by means of a control lever.

However, it is known per se that in this known apparatus, which is, as already stated above, of another type than defined in the opening paragraph, the "successive normal reproduction" mode is started by actuating two keys, namely the keys for "normal reproduction" of the keysets of the two decks. However, in this known apparatus the two decks comprise keysets with different numbers of keys, which as stated above is a disadvantage in view of a most unitary construction of the two decks. However, in the apparatus in accordance with the invention the keysets of both decks have the same number of keys, which in accordance with the invention yields the above advantages.

An embodiment of the invention will now be described in more detail, by way of example, with reference to the accompanying drawings.

Figure 1:
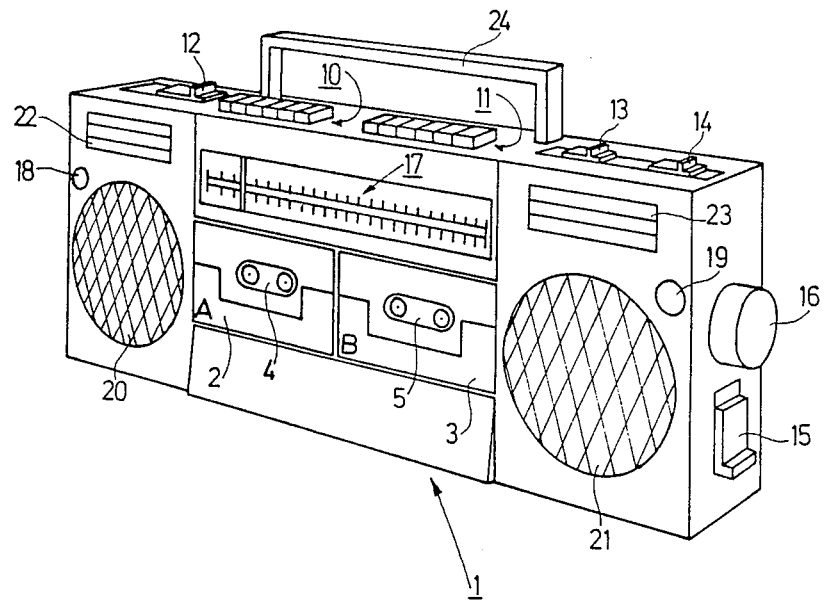

FIG. 1 is a reduced-scale diagrammatic perspective view of a recording and reproducing apparatus for magnetisable record carriers in the form of tapes contained in cassettes, comprising two decks, one deck being constructed for reproduction only and the other deck for recording and reproduction and each deck being provided with a set of keys for selecting the modes of operation in the two decks.

FIG. 2 shows diagrammatically and to a larger scale than FIG. 1 those parts of the two decks of the apparatus of FIG. 1 which are relevant to the invention, illustrating the "successive normal reproduction" mode in the situation in which the first deck which is constructed for reproduction is set to "normal reproduction" and the second deck constructed for recording and reproduction is set to "stand-by".

FIG. 1 shows a portable recording and reproducing apparatus 1 combined with a ratio receiver. The apparatus 1 comprises two cassette compartments which can each be closed by means of partly transparent covers 2 and 3 respectively which are pivotally mounted on the apparatus, which compartments each serve for receiving a cassette 4 and 5 respectively, generally known as Compact Cassette and each containing a magnetisable record carrier 6 and 7 respectively in the form of a tape, briefly referred to hereinafter as magnetic tape, which extends between a first and a second rotatable reel hub. In FIG. 2 the cassettes 4 and 5 and the magnetic tapes 6 and 7 which they contain are represented schematically by dash-dot lines for clarity of the drawing. For driving and scanning the first magnetic tape 6 in the cassette 4 the apparatus 1 comprises a first deck 8 which is constructed only for reproduction of signals stored on the first magnetic tape 6, which deck can be set at least to the modes "stop", "stand-by" and "normal reproduction". For driving and scanning the second magnetic tape 7 in the cassette 5 the apparatus 1 comprises a second deck 9 constructed for recording signals on and reproducing signals from the second magnetic tape 7, which deck can be set to at least the modes "stop" "stand-by", "normal recording" and "normal reproduction". In so far as this is necessary for a correct understanding of the present invention the two decks 8 and 9 are shown in greater detail in FIG. 2 and are described in more detail hereinafter with reference to FIG. 2. For selecting the modes of operation of the two decks 8 and 9 each deck is equipped with a keyset 10 and 11 respectively comprising a plurality of keys. The construction of the two keysets 10 and 11 is also described with reference to FIG. 2.

As can be seen in FIG. 1, the apparatus 1 further comprise a slide switch 12 for switching between rado reception and cassette recording/reproduction, two slide controls 13 and 14 for volume control and tone control respectively, a slide switch 15 for switching between different waveranges and a rotary knob 16 for station selection during radio reception. The selected station can be read from a station scale 17. Further, the apparatus 1 comprises two microphones 18 and 19, two loudspeakers 20 and 21 and two recording-level indicators 22 and 23. The apparatus 1 is provided with a carrying bracket 24 to allow the apparatus to be carried conveniently.

The two decks 8 and 9 of the apparatus 1 will now be described in more detail with reference to FIG. 2. In FIG. 2 all but one of the similar parts in the two decks bear the same reference numerals. The two decks 8 and 9 each comprise a substantially plate-shaped chassis 25. The two identical chassis 25 are simply interconnected by means of a dovetail joint 26.

The two decks 8 and 9 each comprise a drive means 27 comprising a plurality of drive elements for driving the relevant magnetic tape 6 and 7 respectively. Each drive means 27 comprises a normal-transport drive mechanism, shown in FIG. 2, for driving the magnetic tape 6 or 7 with a normal speed for the purpose of recording or reproduction, and a winding mechanism, which for the sake of clarity is not shown in FIG. 2, for fast transport of the magnetic tape 6 or 7 to wind the magnetic tape between the two reel hubs in the cassette 4 or 5 with a transport speed higher than during normal transport. In the present apparatus the drive means 27 of the two decks 8 and 9 can be driven by means of a single motor 28 which is common to the two decks and which is mounted on the chassis of the first deck 8, namely on the underside of the chassis as shown in FIG. 2. The motor 28 drives two axially facing pulleys 29 which in their turn drive two belts 30 and 31. The drive means 27 of the two decks 8 and 9 can be driven by means of the these two belts 30 and 31. Since only one motor 28 is provided the drive means 27 of the two decks 8 and 9 are are always driven simultaneously. Obviously, it is also possible to provide a separate motor for each deck but this renders the apparatus more expensive.

As already stated, the drive means 27 of the two decks 8 and 9 can be driven simultaneously by means of the two belts 30 and 31. For this purpose the two belts 30 and 31 are each passed over a flywheel 32 arranged beneath the chassis 25. Each flywheel 32 is coaxially connected to a capstan 33 which extends through and is rotatably journalled in the chassis 25. The free end of each capstan 33 which projects from the upper side of the chassis 25 and which serves to cooperate with the magnetic tape 6 or 7 is passed through a slot 34 in a supporting plate 36 which is movably guided on the chassis 25, in the direction indicated by the double arrow 35. A pressure-roller lever 37 is pivotally mounted on each supporting plate 36 and a pressure roller 38 is rotatably mounted on this lever. The pressure roller 38 is constructed to cooperate with the capstan 33 and constitutes a drive element of the drive means 27. When the pressure roller 38 is clear of the capstan 33 the free end of the pressure roller 37 abuts against a stop 40 which projects from the supporting plate 36 under the influence of a tension spring 39 acting on this roller.

Beneath the chassis 25 each capstan 33 carries a pinion 41 which is constantly in mesh with a pivotally mounted intermediate gear wheel 42 independently of its pivotal position. The intermediate gear wheel 42 is rotatably mounted on a triangular lever 43 which is pivotable between two operating positions about a spindle 44 on the chassis 25. In one of these operating positions the intermediate gear wheel 42 is in mesh with a drive gear wheel 46 which is coaxial with a winding spindle 45, as is shown for the first desk 8, whilst in the other operating position of the lever 43 the intermediate gear wheel 42 is out of mesh with the drive gear wheel 46, as is shown for the second deck 9. The lever 43 is moved between its two operating positions by the supporting plate 36 via a slot 47 which acts as a cam surface and which is engaged by a pin 49 which acts as a cam follower and which projects upwardly from the lever 43 through a rectangular opening 48 in the chassis 25. It is to be noted that the drive gear wheel 46 can drive a drive wheel 50 via a disc-shaped friction coupling, not shown, which drive wheel is rigidly connected to the winding spindle 45. The unwinding spindle 51 can be driven by gear wheel 52 which is coaxial with and rigidly connected to this spindle. As is apparent from the foregoing, the drive means 27 of the two decks 8 and 9 are fully identical.

Each of the two decks 8 and 9 comprises an end-stop device 53 which sets the relevant deck 8 or 9 to the "stop" mode when the end of the relevant magnetic tape 6 or 7 is reached. Each end-stop device 53 comprises a cam gear wheel 54 which is rotatable about the spindle 44 and which can be driven by an intermediate pinion 55 which is coaxial with the intermediate gear wheel 42. On a radial surface which faces away from the underside of the chassis 25 the cam gear wheel 54 has a basically endless control cam 46 and a crescent-shaped actuating cam 57. Further, each end-stop device 53 comprises a three-arm end-stop lever 59 which is pivotable about a spindle 58 on the chassis 55. By means of a friction coupling, not shown, a dirst lever arm 60 of the end-stop lever 59 is coupled to the drive wheel 50 which is rigidly connected to the winding spindle 45, so that during rotation of the winding spindle 45 an actuating force is exerted on the end-stop lever 59 via the drive wheel 50 and the first lever arm 60, which force tends to pivot the end-stop lever 59 in the anti-clockwise direction as indicated in FIG. 2. On its free end a second lever arm 61 of the end-stop lever 59 carries a projection 53 which extends upwardly through a rectangular opening 62 in the chassis and is constructed to cooperate with the supporting plate 36. When the supporting plate 36 is in its normal-transport position, as is the case with the supporting plate 36 of the first deck 8 in FIG. 2, the projection 63 can engage an opening 64 in the supporting plate 36 under the influence of the actuating force exerted on the end-stop lever 59 via the first lever arm 60. This is not possible when the supporting plate 36 of the second deck 9 is in its stand-by position as shown in FIG. 2 or when the plate 36 is in its stop position, the end-stop device 53 then being rendered inoperative. A third lever arm 65 of the end-stop lever 59 carries a pin 66 which is constructed to cooperate with a latching member 68, which is shown schematically and which is loaded by a tension spring 67. An arm 70 is articulated to the end-stop lever 59, by means of an integral hinge 69 and is loaded in tension relative to the end-stop lever 59 by a compression spring 61, its free end abutting against a hook-shaped projection 72 of the end-stop lever 59 during normal operation. A cam-follower pin 73 projects upwardly from the lever arm 70 and its free end is constructed to cooperate with the control cam 56 and the actuating cam 57 of the cam gear wheel 54. As is apparent from the foregoing, the end-stop devices 53 of the two decks 8 and 9 are fully identical.

As long as a transport of the magnetic tape 6 or 7 takes place and, consequently, the winding spindle 45 rotates, the following cycle of the movements is performed in the end-stop device 53. The cam gear wheel 54 is rotated anti-clockwise by the flywheel 42 via the capstan 33, the pinion 41, the intermediate gear wheel 42 and the intermediate pinion 55. Further, the intermediate gear wheel 42 drives the drive gear wheel 46, which by means of the friction coupling, not shown, drives the drive wheel 50 which is rigidly connected to the winding spindle 45, the drive wheel 50 transmitting an actuating force to end-stop lever 59 via the friction coupling, not shown, and the first lever arm 60, which force tends to pivot the end-stop lever 59 anti-clockwise. As long as this actuating force is exerted on the end-stop lever 59 the pin 73 which projects from the arm 70 of the end-stop lever 59 remains in contact with the control cam 56, the control cam 56 imparting a pendulum movement to the end-stop lever 59 via the pin 73 and the arm 70, which is loaded in tension relative to the end-stop lever 59 by means of the compression spring 71, without the pin 66 on the third lever arm 65 of the end-stop lever 59 touching the latching member 68. When the end of the magnetic tape 6 or 7 is reached the winding spindle 45 is automatically stalled, so that the winding spindle 45 and the drive wheel 50 which is rigidly connected thereto are stopped, as a result of which the friction coupling between the drive wheel 50 and the drive gear wheel 46 slips and consequently the first lever arm 60 of the end-stop lever 59 is no longer driven. The actuating force exerted on the end-stop lever 59 in the anti-clockwise direction is then discontinued. If subsequently the control cam 56 on the cam gear wheel 54 has pivoted the end-stop lever 59 in a clockwise direction, the end-stop lever 59 remains in this position in which it is pivoted anti-clockwise by the drive wheel 50 because the actuating force has ceased, in which position the pin 73 on the arm 70 is engaged by the actuating cam 57. Since the arm 70 is loaded in tension relative to the end-stop lever 59 by the compression spring 71, the end-stop lever 59 is pivoted further by the actuating cam 57, the pin 66 on the third lever arm 65 of the end-stop lever 59 abutting against the latching member 68, thereby moving this member so far against the force of the tension spring 68 acting on it that the keys which are locked by the latching member 68 are released and return to their off-positions, which means that the relevant deck is set to "stop".

The cycle of movements described in the foregoing is effected only if the supporting plate 36 is in its normal-transport position, as is shown for the first deck 8. When the supporting plate 36 is in its stand-by position, as shown for the second deck 9, or in its stop position, the complete end-stop lever 59 cannot perform a pendulum movement via the projection 63 on the control lever arm 61 of the end-stop lever 59, which projection abuts against the supporting plate 36, so that the end-stop device 53 is inoperative. By means of its control cam 56 the driven cam gear wheel 54 then only imparts to the arm 70 a pivotal movement about the integral hinge 69 relative to the endstop lever 59, causing the compression spring 71 to be compressed periodically.

For scanning the two magnetic tapes 6 and 7 each tape deck 8 and 9 comprises a scanning device 74. The scanning device 74 of the second deck 9, which is constructed to record signals on and to reproduce signals from the second magnetic tape 7 comprises a magnetic recording/reproducing head 75 and a magnetic erase head 76, which are both arranged on the supporting plate 36 of the second deck 9. Both magnetic heads 75 and 76 are provided with a tape-height guide arranged adjacent their head faces. The scanning device 74 of the first deck 8, which is constructed only to reproduce signals from the first magnetic tape 6, comprises a magnetic reproducing head 77 which is arranged on the supporting plate 36 of the first deck 8. The magnetic head 77 is also provided with a tape-height guide arranged adjacent its head face. Instead of a magnetic erase head the supporting plate 36 of each first deck 8 only carries a tape-height guide 78.

Each tape deck 8 and 9 comprises a positioning device for positioning the scanning device 64 of each deck 8 and 9 and at least one drive element of the drive means 27 of each deck 8 or 9, in the present case two drive elements, namely the pressure roller 38 and the intermediate gear wheel 42. In the present apparatus this positioning device is constituted by the supporting plate 36. The scanning device 74 and the pressure roller 38 are positioned by means of the supporting plate 36 in that these elements are arranged on the supporting plate 36. The intermediate gear wheel 42 is positioned by the supporting plate 36 via the slot 47 in the plate 36 and the pin 49 which is mounted on the lever 43 and which carries the intermediate gear wheel 42. The supporting plate 36 is movable between a stop position, not shown in FIG. 2, in which the scanning device 74 and the pressure roller 38 are rendered inoperative by the cassette 4 or 5 and the intermediate gear wheel 42 is kept out of mesh with the drive gear wheel 46, and a stand-by position, as is shown for the second deck 9, in which position the scanning device 74 gently contacts the magnetic tape but the pressure roller 38 still has a slight clearance relative to the capstan 33, and in which the intermediate gear wheel 42 is not in mesh with the drive gear wheel 46 and a normal-transport position, as is shown for the first deck 8, in which position the scanning device 47 is in full contact with the magnetic tape, the pressure roller 38 is pressed against the capstan 33, and the intermediate gear wheel 43 is in mesh with the gear wheel 46. The supporting plate 36 of each deck 8 or 9 is moved between these three positions depending on the mode of operation selected for the relevant tape deck. The two supporting plates 36 which serve as positioning devices for the two decks 8 and 9 are also fully identical.

For selecting the modes of operation, as already stated, each of the two decks 8 and 9 is provided with a keyset 10 and 11 respectively comprising a plurality of keys. As can be seen in FIG. 2, the keysets 10 and 11 of the two decks 8 and 9 have equal numbers of keys, namely six keys each. This is advantageous for a most unitary construction of the two decks 8 and 9. All the keys of the two keysets 10 and 11 are each movable from their off-positions to their on-positions in the direction indicated by the arrow P against the force of a return spring, not shown, which acts against a key slide.

The two keysets 10 and 11 each comprise a stand-by key 79 for selecting the "stand-by" mode, whose slides 80 cooperate with a separate latching device, not shown, which is constructed, for example, as Schadow-type latch. This latching device retains the stand-by key 79, after actuation, in its on-position via its slide 80. When the stand-by key 79 is actuated again the latching devices releases the slide 80, so that the stand-by key 79 is then returned to its off-position by the return spring which acts on the slide 80. By means of the stand-by key 79 and its slide 80, which is shown only partly, the supporting plate 36 of the relevant deck 8 or 9 can be set to a stand-by position. How this is achieved is generally known and is irrelevant to the present invention, for which reason this is not illustrated in FIG. 2.

Further, the two keysets 10 and 11 each comprise a reproduction key 81 for starting the "normal reproduction" mode, a fast-forward key 82 for selecting the "fast forward" mode, a fast-reverse key 83 for selecting the "fast reverse" mode and a stop key 84 for selecting the "stop" mode. The slides 85, 86, 87 and 88 of said keys 81, 82, 83 and 84, of which the slides 86, 87 and 88 are shown only partly, cooperate with the latching member 68, which is only diagrammatically shown in FIG. 2 because its construction and operation are generally known. Such a latching member construction is, for example, shown and described in AT-PS 314,219. The slides 85, 86 and 87 can be retained by the latching member 68. The slide 88 of the stop key 84 cannot be latched by the latching member 68 and serves for actuating the latching member 68 against the force exerted on it by the tension spring 67 to release the keys which are latched by means of the latching member 68, causing the apparatus to be set to "stop". By means of the slides 86 and 87 the winding mechanism of the drive means 27 can be set to the desired mode of operation. Since this is relevant to the present invention, this is not illustrated in FIG. 2 for the sake of clarity.

The supporting plate 36 of the relevant deck 8 and 9 can be positioned by means of the slide 85 of the reproduction key 81 of each keyset 10 or 11. For this purpose a tension spring 92 is tensioned between a lateral projection 89 of the slide 85 and a downward projection 91 on the supporting plate 36, which projection 91 extends through an opening 90 in the chassis 26. When the reproduction key 81 is in its off-position, in which it is retained by the return spring acting on its slide 85, a pin 94 which projects downwardly from the supporting plate and which extends through an opening 93 in the chassis 25 is held in abutment against a laterally extending positioning projection 95 of the slide 85 under the influence of the tension spring 92. In this way the stop position of the supporting plate 36, not shown in FIG. 2, is defined. When the reproduction key 81 is latched in its on-position by the latching member 68 against the force of the return spring the slide 85 pulls the supporting plate 36 into its normal-transport position via the tension spring 92 and the projection 91, in which position the end of the supporting plate 36 which is remote from the keyset 10 or 11 abuts against a positioning pin 96 which projects upwardly from the chassis 95, as is illustrated for the first deck 8 in FIG. 2. From this normal-transport position the supporting plate 36 can be set to its stand-by position against the force exerted by the tension spring 92 by actuation of the stand-by key 79, as is illustrated for the second deck 9 in FIG. 2.

The keysets 10 and 11 and the two decks 8 and 9 each comprise a further key, which keys, as will be described hereinafter, serve for selecting different modes of operation in the two decks. In order to illustrate this difference the two keys, although they are of the same construction, bear different reference numerals, namely 97A and 97B. The two keys 97A and 97B are each connected to a slide 98 on which a return spring, not shown, acts. Each slide 98 also cooperates with the latching member 68; namely in such a way that after actuation of a key the slide 98 is retained by the latching member 68 against the force of the return spring.

The key 97B of the keyset of the second deck 9 serves for selecting the "normal recording" mode of the second deck 9. For selecting the "normal recording" mode in the second deck the recording key 97B is actuated. Via its slide 98 a recording/reproduction switch associated with the second deck 9 and located inside the apparatus 1 is then set to its recording position and further a first intermediate lever 100, which is pivotable about a spindle 99 on the chassis 25, and a second intermediate lever 102, which is pivotable about a spindle 101 on the chassis 25, by means of said first intermediate lever 100, are pivoted. During the pivotal movement of the second intermediate lever 102 this lever abuts against an actuating projection 103 of the slide 85 of the reproduction key 81 and moves this slide 86 so far that the reproduction key 81 is pulled into its on-position without being actuated. Via the slide 85 and the tension spring 92 the supporting plate 36 is then pulled in its normal-transport position. Since the recording/reproducing switch associated with the deck 9 is in its recording position and the supporting plate 36 of the second deck 9 is in its normal-transport position, the second deck is now in the "normal recording" mode.

In addition to the above-mentioned modes the apparatus 1 and its two decks 8 and 9 can also be set to an "successive normal reproduction" mode, which is possible by actuating a key of the keyset 10 of the first deck 8 and the reproduction key 81 for selection of the "normal reproduction" mode of the keyset 11 of the second deck 9. In the "successive normal reproduction" mode the supporting plate 36 of the first deck 8 is first set to its normal-transport position to switch to the "normal reproduction" mode and in the second deck 9 the supporting plate 36 is set to its stand-by position to switch to the "stand-by" mode, after which in the first deck 8 the supporting plate 36 is set to its stop position to switch to the "stop" mode and in the second deck 9 the supporting plate 36 is set to its normal-transport position to switch to the "normal reproduction" mode, after which the supporting plate 36 of the second deck 9 is also set to its stop position to switch to the "stop" mode.

For starting the "successive normal reproduction" mode in the present apparatus the key 97A of the keyset 10 of the first deck is used, which corresponds to the recording key 97B for the "normal recording" mode of the keyset 11 of the second deck 9 and which is present on account of the identical construction of the two keysets 10 and 11 but which is not necessary for starting a "normal recording" mode in the first deck 8 which is designed for reproduction only.

When the successive-reproduction key 97A of the keyset 10 of the first deck 8 is actuated, similarly to actuation of the recording button 97B of the keyset of the second deck 9, the slide 85 is set of to its normal-transport position via the slide 98, the first intermediate lever 100, the second intermediate lever 102 and the actuating projection 103 of the slide 85, and the supporting plate 35 of the first deck is also set to its normal-transport position via the tension spring 92, so that the first deck 8 is set to the "normal reproduction" mode. As a result of the movement of the slide 85 the reproduction key 81 is also moved without being actuated. It is to be noted that unlike the second deck 9 the first deck 8 is not associated with a recording/reproduction switch inside the apparatus which can be actuated by the slide 98.

When the successive-reproduction key 97A of the keyset 10 of the first deck 8 is actuated the control lever 106, which is pivotable about a spindle 105 on the chassis 25 of the deck 9, which extends from the first deck 8 to the second deck 9, and which is coupled to the slide 98 via a pin-and-slot coupling 104 is actuated via said slide 98, which lever in the "successive normal reproduction" mode in the second deck 9 when the first deck 8 is set to "stop". On the end of its lever arm which extends towards the supporting plate 36 of the second deck the control lever 106 carries a positioning pin 107 which serves to cooperate with an upwardly projecting strip 108 on the supporting plate 36. When the successive-reproduction key 97A of the keyset 10 of the first deck 8 is actuated the supporting plate 36 in the second deck 9, as is illustrated for the second deck in FIG. 2, is set to its stand-by position via the pivotable control lever 106 with its positioning pin 107 and the strip 108 to switch to the "stand-by" mode, which supporting plate is shifted from its stop position to its normal-transport position upon actuation of the reproduction key 81 of the keyset 11 of the second deck 9.

As is apparent from the above description of the keysets 10 and 11 of the decks 8 and 9, the keysets of the two decks and the latching members which cooperate therewith are fully identical.

The operation of the apparatus in the "successive normal reproduction" mode will now be described hereinafter. To select the "successive normal reproduction" mode the successive-reproduction key 97A of the keyset 10 of the first deck 8 and the reproduction key 81 of the keyset 11 of the second deck 9 are actuated. The key 97A and subsequently the key 81 of the keyset 11 may then be actuated. However, it is also possible to actuate both keys simultaneously. It is an advantage that for selecting the "successive normal reproduction" mode only two keys have to be actuated. By the actuation of the successive-reproduction key 97A the supporting plate 36 in the first deck is set to its normal-transport position to start the "normal reproduction" mode via the first intermediate lever 100, the second intermediate lever 102 and the slide 85 of the reproduction key 81 of the keyset 10 of the first deck 8, and via the control lever 106 in the second deck 9 the supporting plate 36 of this deck, which as a result of the actuation of the reproduction key 81 of the keyset 11 of the second deck 9 is moved from its stop position towards its normal-transport position via the slide 85 and the tension spring 92, is set to its stand-by position to start the "stand-by" mode, because the positioning pin 107 is situated in the path of movement of the strip 108 on the supporting plate 36 of the second deck 9. Thus, after actuation of said two keys 97A and 81 the first deck 8 is set to the "normal reproduction" mode and the second deck 9 is set to "stand-by". Since the second deck 9 is in the "stand-by" mode its end-stop device 53, as stated in the foregoing, is rendered inoperative, so that the latching member cannot be actuated and, consequently, the reproduction key 82 of the keyset 11 of the second deck 9 remains latched. The first magnetic tape 6 is now driven via the drive means 27 of the first deck 8, the signals recorded on this tape being reproduced by means of the magnetic head 77 of the scanning device 74 of the first deck 8. This reproduction mode of the first deck 8 can be stopped when the stop key 84 of the keyset 10 of the first tape deck 8 is actuated by the user of the apparatus. If this is not done, reproduction continues until the end of the first magnetic tape 6 is reached. The end-stop device 53 of the first deck 8 is then activated. As a result of the actuation of the stop key 84 for the actuation of the end-stop device 53 the latching member 68 of the first deck 8 is moved to be released against the force of the tension spring 67 acting on it, so that the successive-reproduction key 97A and the simultaneously actuated reproduction key 81 of the keyset 10 are returned to their off-positions, the first deck 8 being consequently set to "stop". When the successive-reproduction 97A is set to its off-position the control lever 106 is activated via its slide 98 and consequently the positioning pin 107 is moved out of the path of movement of the strip 108, so that the supporting plate 36 of the second deck 9 is pulled into its normal-transport position via the tension spring 92 and consequently the second deck 9 is set to the "normal reproduction" mode. The end-stop device 53 of the second deck 9 is then also released for normal operation. Now the second magnetic tape 7 is driven via the drive means 27 of the second deck 9, the recorded signals being reproduced by the magnetic head 75 of the scanning device 74 of the second deck 9. Reproduction by the second deck 9 can be terminated, in the same way as for the first deck 8, by actuation of the stop key 84 of the keyset 11 of the second deck 9 or by activation by the end-stop device 53 of the second deck 9. In both cases the latching member 68 of the second deck 9 is moved to be released against the force of the tension spring 67 acting on it, so that the reproduction key 81 of the keyset 11 of the second deck 9 returns to its off-position and consequently the second deck 9 is also set to "stop".

As is apparent from the foregoing, the two decks in the apparatus in accordance with the invention comprise fully identical keysets with equal numbers of keys. This is advantageous for a most unitary construction of the two decks in order to enable the decks and hence the entire apparatus to be manufactured as cheaply as possible. Further, the two decks also comprise identical chassis, drive means, end-stop devices and supporting plates. The two decks differ only in respect of their scanning devices, one device comprising only one magnetic head and one tape-height guide and the other device comprising two magnetic heads. In this way it is achieved that the two decks can be manufactured for the greater part in a single production process, which is very economical, particularly in the case of mechanised production. After termination of the common production phase of the two decks, the double deck in the apparatus in accordance with the invention can be formed simply by joining the two individual decks by means of the dovetail joint and subsequently mounting the different scanning devices on the supporting plates of the relevant decks and the control lever in its support on the chassis of the second deck, so that in total the manufacture of a double deck is greatly simplified. Suitably, the successive-reproduction key of the keyset of the first deck performs a double function, because by means of this key the first deck can be set to the "normal reproduction" mode and the second deck to the "stand-by" mode. Since the successive-reproduction key performs a double function only two keys have to be actuated for selecting the "successive normal reproduction" mode, namely the successive-reproduction key of the keyset of the first deck and the reproduction key of the keyset of the second deck, so that selection of this mode is very simple. In order to preclude incorrect operation it is advantageous that the two keys may be actuated consecutively or simultaneously. Since the control lever cooperates directly with the supporting plate of the second deck for controlling this deck a very simple and reliable construction is obtained.

Obviously a series of modifications are possible within the scope of the invention. For example, the successive-reproduction key of the keyset of the first deck and the reproduction key of the keyset of the second deck need not act on the supporting plate via the two intermediate levers and the slide of the reproduction key but they can also cooperate directly with the supporting plate in the same way as the reproduction key. In the embodiment of the apparatus described above the keys act directly on the apparatus parts to be activated. However, each deck may also comprise a so-called key servo-mechanism, which is activated by actuation of the keys and which in its turn actuates the relevant apparatus parts. It is then also possible to utilize non-locking keys which have to be actuated until the relevant key servo-mechanism has responded. An apparatus in accordance with the invention may also comprise two decks constructed as auto-reverse decks which first perform reproduction in a normal direction of tape transport and immediately after this perform reproduction in the opposite direction of transport of the magnetic tape. An apparatus in accordance with the invention comprising two auto-reverse decks operates in such a way that in the "successive normal reproduction" mode the change-over from reproduction by the first deck to reproduction by the second deck by means of the end-stop device in the first deck is not carried out until the first deck has completed reproduction in the two opposite directions of normal reproduction.

What is claimed is:

1. A recording and reproducing apparatus (1) for record carriers (6, 7) in the form of tapes accommodated in cassettes (4, 5), comprising a first deck (8) for driving and scanning a first record carrier (6) which deck is constructed for reproduction only and can be set to at least the "stop", "stand-by" and "normal reproduction" modes, and comprising a second deck (19) for driving and scanning a second record carrier (7), which deck is constructed for recording and reproducing and can be set to at least the "stop", "stand-by", "normal reproduction" and "normal recording" modes, which decks each comprise a drive means (27) for driving the relevant record carrier (6, 7), which drive means each comprise a plurality of drive elements (32, 33, 38, 42, 45, 46, 50, 51, 52), a scanning device (74) for scanning the relevant record carrier (6, 7) and a positioning device (36) which can be set to a stop position, a stand-by position and a normal-transport position, for positioning the scanning device (74) and at least one drive element (38, 42) of the drive means (26) of the relevant deck (8, 9) in conformity with the mode to which said deck is set, and which each comprise a keyset (10, 11) comprising a plurality of keys (79, 81, 82, 83, 84), (97A, 97B) for selecting the modes of operation of the relevant decks (8, 9), the positioning device (36) of each deck (8, 9) being movable by actuation of at least one key (79, 81, 97A, 97B) of the keyset of each deck and both decks (8, 9) being switchable to a "successive normal reproduction" mode by actuation of a key (97A) of the keyset (10) of the first deck (8) and at least the key (81) for the "normal reproduction" mode of the keyset (11) of the second deck (9), in which "successive normal reproduction" mode first the positioning device (36) in the first deck (8) is set to its normal-transport position to obtain the "normal reproduction" mode and the positioning device (36) in the second deck (9) is set to its standby position to obtain the "standby" mode, subsequently the positioning device (36) in the first deck (8) is set to its stop position to obtain the "stop" mode and the positioning device (36) in the second deck (9) is set to its normal-transport position to obtain the "normal reproduction" mode, and after this the positioning device (36) in the second deck (9) is also set to its stop position to obtain the "stop" mode, and comprising a control lever (106) which extends from the first deck (8) to the second deck (9), which lever in the "successive normal reproduction" mode, when the first deck (8) is in the "stop" mode, controls the start of the "normal reproduction" mode in the second deck (9), characterized in that the keysets (10, 11) of the two decks (8, 9) comprise equal numbers of keys (79, 81, 82, 83, 84, 97A, 97B), in that the "successive normal reproduction" mode can be started by actuating the key (97A) of the keyset (10) of the first deck (8), which corresponds to the key (97B) for the "normal recording" mode of the keyset (11) of the second deck (9), and the key (81) for the "normal reproduction" mode of the keyset (11) of the second deck (9), and in that by actuating the key (97A) of the keyset (10) of the first deck (8), which corresponds to the key (97B) for the "normal recording" mode of the keyset (11) of the second deck (9), the positioning device (36) in the first deck (8) is set to the normal-transport position to obtain the "normal reproduction" mode and via the control lever (106) which is movable by actuation of said key (97A) in the second deck (9) the positioning device (36) of this deck is set to its stand-by position to obtain "stand-by" mode.

* * * * *